(12) United States Patent
Font Burdeus et al.

(10) Patent No.: US 12,121,814 B2
(45) Date of Patent: Oct. 22, 2024

(54) METHOD AND SYSTEM FOR AUTOMATIC SYNTHESIS OF VIDEOGAME ASSETS

(71) Applicant: FUNDACIÓN UNIVERSIDAD SAN JORGE, Villanueva de Gállego (ES)

(72) Inventors: Jaime Font Burdeus, Huesca (ES); Daniel Blasco Latorre, Saragossa (ES); Carlos Cetina Englada, Saragossa (ES)

(73) Assignee: FUNDACIÓN UNIVERSIDAD SAN JORGE, Villanueva de Gállego (ES)

( * ) Notice: Subject to any disclaimer, the term of this patent is extended or adjusted under 35 U.S.C. 154(b) by 198 days.

(21) Appl. No.: 17/786,320

(22) PCT Filed: Feb. 26, 2021

(86) PCT No.: PCT/EP2021/054836
§ 371 (c)(1),
(2) Date: Jun. 16, 2022

(87) PCT Pub. No.: WO2021/175715
PCT Pub. Date: Sep. 10, 2021

(65) Prior Publication Data
US 2023/0028697 A1    Jan. 26, 2023

(30) Foreign Application Priority Data
Mar. 2, 2020    (EP) .................................... 20382150

(51) Int. Cl.
*A63F 13/67*    (2014.01)
*A63F 13/65*    (2014.01)

(52) U.S. Cl.
CPC .............. *A63F 13/67* (2014.09); *A63F 13/65* (2014.09); *A63F 2300/6027* (2013.01); *A63F 2300/69* (2013.01)

(58) Field of Classification Search
CPC .......... A63F 13/60; A63F 13/65; A63F 13/67; A63F 2300/6027; A63F 2300/69
See application file for complete search history.

(56) References Cited

U.S. PATENT DOCUMENTS 11,192,034 B1 * 12/2021 Koch .................... A63F 13/825
11,376,505 B2 * 7/2022 Jackson ............... A63F 13/213
2012/0077580 A1    3/2012 Mahajan et al.
(Continued)

FOREIGN PATENT DOCUMENTS

EP        2530932 A2    12/2012
EP        3546037 A1    10/2019

*Primary Examiner* — James S. McClellan
*Assistant Examiner* — Ross A Williams
(74) *Attorney, Agent, or Firm* — The Webb Law Firm (57) ABSTRACT

The present disclosure refers to a method and a system for synthesizing videogame assets, the method includes receiving a first set of videogame assets as input in a videogame asset synthesizer. The videogame asset synthesizer may identify certain common features among the assets of the first set of videogame assets and clusters the videogame assets into different asset profiles based on the certain common features identified. The videogame asset synthesizer may synthesize a subset of asset candidates for an asset profile, based on the videogame assets clustered into the asset profile and rate the asset candidates synthesized, based on a threshold set for at least one parameter of the asset candidates. The assets may be stored in a database, based on the rating.

15 Claims, 2 Drawing Sheets

(56) References Cited

U.S. PATENT DOCUMENTS

| | | |
|---|---|---|
| 2012/0309543 A1 | 12/2012 | Shimada |
| 2013/0102379 A1 | 4/2013 | Sargent et al. |
| 2013/0281216 A1* | 10/2013 | Shimoyamada ...... A63F 13/327 |
| | | 463/42 |
| 2014/0038722 A1 | 2/2014 | Schmidt et al. |
| 2015/0062131 A1 | 3/2015 | Chann et al. |
| 2015/0151204 A1* | 6/2015 | Yamaguchi ......... A63F 13/2145 |
| | | 463/31 |
| 2019/0299108 A1 | 10/2019 | Andall |

* cited by examiner

METHOD AND SYSTEM FOR AUTOMATIC SYNTHESIS OF VIDEOGAME ASSETS

CROSS-REFERENCE TO RELATED APPLICATIONS

This application is the United States national phase of International Application No. PCT/EP2021/054836 filed Feb. 26, 2021, and claims priority to European Patent Application No. 203821509 filed Mar. 2, 2020, the disclosures of which are hereby incorporated by reference in their entirety.

BACKGROUND

Field of the Invention

Present disclosure generally relates to the field of videogames and computer graphics and more specifically to the methods and systems for automatically synthesizing videogames assets.

Description of Related Art

Traditionally videogames were created by small development teams and then released to the market with no further maintenance work or extensions on part of the developers. When the videogame was released, the work on part of the development team was over. Players use to visit a physical store, buy the videogame (in any physical format such as cartridge or CD) and play it until bored or the game was over, concluding the life of the game and thus the experience of the player. However, this is no longer the model in use for commercial videogames.

Nowadays, most successful games try to extend the life of the games and the experience of the user. This is mainly achieved by the inclusion of more content into the initial release of the videogame or by the release of expansions that include more content for the videogame. This results in an increase of the time spent on the development of the game and in the sizes of the teams working on them (especially those roles related to the creation of content for the videogame).

The emergence of digital platforms (such as Steam® or PlayStation® Network) have also influenced the change of the model. The relationship between the players and the videogame is wider than years ago and transcends the videogame itself. The budget for marketing of the videogames is heavier nowadays, including advertising campaigns, teasers, release dates, upgrades, interviews, reviews, videoplays, youtubers, and so. As a result, the pressure put over the development teams is higher, as the players are expecting new content to be delivered continuously.

In the modern industry of videogames there is constant need for new content and development teams have grown to fulfill those needs. However, traditional development is no longer able to address the schedules and quantities demanded from the industry of videogames, yielding to new solutions to produce new content.

One of the solutions used by the industry is to enable regular players to generate new content ("mods"), through the inclusion of game content editors in the game itself. However, the content generated by users is not always able to fulfill the quality criteria determined by game creators to ensure that the players have a good game experience. To this end, control mechanisms are introduced to ensure that the content generated by the users has enough quality. For instance, the patent EP 3 546 037 A1 proposes a content generation guidance system that helps the users while creating the new content, trying to raise the quality of the content produced. Also, patent EP 2 530 932 A2 Proposes a mechanism where the players can rate the content (as good or bad) as a mechanism to measure the quality of the content.

Therefore, the state of the art is missing technical contributions for an alternative creation of content whose quality has be ensured.

SUMMARY

The present disclosure solves the aforementioned problems by providing new videogame assets synthesized from the original content created by the development team. Thus, one aspect of present disclosure refers to a method for synthesizing videogame assets, the method comprising the following steps:

receiving a first set of videogame assets as input;
identifying certain common features among the assets of the first set of videogame assets;
clustering the videogame assets into different asset profiles based on the certain common features identified;
synthesizing a subset of asset candidates for an asset profile, based on the videogame assets clustered into the asset profile;
rating the asset candidates synthesized, based on a threshold set for at least one parameter of the asset candidates, (such as the range of colours used for the palette of a texture or the number and type of weapons being used by an enemy); and
storing the assets in a database, based on the rating.

In one embodiment of the present disclosure synthesizing the subset of asset candidates comprises synthesizing at least one asset candidate by modifying one asset from the first set of videogame assets received. One example of modification could be a change in the health of an enemy to a random value or to one value randomly chosen from a set previously provided.

Alternatively or in combination with the previous embodiment, synthesizing the subset of asset candidates may also comprise synthesizing at least one asset candidate by combining at least two assets from the first set of assets received.

Alternatively or in combination with the previous embodiments, synthesizing the subset of asset candidates may also comprise synthesizing at least one asset candidate by creating the asset from scratch.

Additionally, storing the assets in the database may further comprise the step of discarding the assets rated under a minimum rating required. Thus, the assessment of candidates is reiterated until the candidates reach the minimum rating required to be accepted and stored in the database. Advantageously, the quality of the new videogame assets is ensured.

In one embodiment of the present disclosure, rating the asset candidates comprises comparing a set of features of the asset candidates with the same set of features of the first set of videogame assets. Thus, advantageously, the synthesization of new assets is guided by the similitude of the assets being synthesized and the assets provided as input.

In one embodiment of the present disclosure, rating the asset candidates further comprises recording player experience information of a user playing with the first set of videogame assets. Thus, advantageously, the synthesization of new assets is guided by the experience automatically captured from players while playing with the first set of videogame assets, that is the assets originally created by the developers.

In one embodiment of the present disclosure, rating the asset candidates further comprises recording player experience information of a user playing with the assets stored in the database. Thus, advantageously, the synthesization of new assets is guided by the experience automatically captured from players while playing with the assets stored in the database, that is the assets synthesized by present disclosure.

According to one embodiment, the present disclosure further comprises serializing the assets in the database. Thus, advantageously, the synthesized assets are translated into a format that can be easily stored, transmitted and reconstructed later.

A second aspect of the present disclosure refers to a system for synthesizing videogame assets comprising a videogame asset synthesizer configured for receiving a first set of videogame assets; identifying certain common features among the assets of the first set of videogame assets; clustering the videogame assets into different asset profiles based on the certain common features identified; synthesizing a subset of asset candidates for an asset profile, based on the videogame assets clustered into the asset profile; and rating the asset candidates synthesized, based on a threshold set for at least one parameter of the asset candidates; and sending the assets to a database to be stored based on the rating.

Additionally, in one particular embodiment, the present disclosure further comprises a database configured for storing assets sent from the videogame asset synthesizer, based on the rating.

In one embodiment, the present disclosure further comprises a player experience recorder configured for recording player experience information while playing with certain videogame assets, wherein the database is further configured for storing the player experience information recorded.

According to one embodiment of the present disclosure, the system for synthesizing videogame assets further comprises a telecommunication network configured for exchanging information between the videogame asset synthesizer, the database and the player experience recorder.

Optionally, the present disclosure may comprise a videogame execution device connected to the telecommunication network, configured for executing videogames resulting from the assets stored in the database.

Another aspect of the present disclosure refers to a computer program product that comprises program code means adapted to perform the steps of the method disclosed above, when said program is executed in a general purpose processor, a digital signal processor, an FPGA, an ASIC, a microprocessor, a microcontroller, or any other form of programmable hardware.

A last aspect of the present disclosure refers to a computer-implemented method for synthesizing a videogame asset, comprising the steps of: receiving a first set of videogame assets as input; identifying certain common features among the assets of the first set of videogame assets; clustering the videogame assets into different asset profiles based on the certain common features identified; synthesizing a subset of asset candidates for an asset profile, based on the videogame assets clustered into the asset profile; and rating the asset candidates synthesized, based on a threshold set for at least one parameter of the asset candidates.

BRIEF DESCRIPTION OF THE DRAWINGS

To complete the description and in order to give a better understanding of the features of the present disclosure, this specification is accompanied by a series of drawings that are an integral part of the same, wherein the following has been represented for illustration purposes and without limitation.

DETAILED DESCRIPTION OF THE INVENTION

In the following description, at least one embodiment for carrying out the present disclosure is disclosed in detail with reference to the aforementioned figures. It will be apparent to one skilled in the art that the terms used in the present specification are merely used to describe particular embodiments, and are not intended to limit the present disclosure.

Any expression used in the singular encompasses the expression of the plural, unless it has a clearly different meaning in the context. In the following description, it is to be understood that terms such as "including", "having", etc. are intended to indicate the existence of the features, numbers, steps, actions, elements, parts, or combinations, but they are not intended to preclude the possibility that one or more other features, numbers, steps, actions, elements, parts, or combinations may be added.

Videogame assets are originally created by large team of professionals from multiple fields (artists, musicians, writers, designers, programmers) responsible of producing all the different assets that compose the game (maps, textures, audios, quests, mechanics, physics, behaviours, models, characters) and make them work together as a single unit (the videogame). Hereinafter, it will be described the solution of the present disclosure, according to at least one particular embodiment, for automatically generating new content through a content synthesizer, which is fed with videogame content whose quality has be ensured (e.g.: created by the original development team).

Additionally, the synthesis process can be guided by some information regarding user experience of the players gathered when they play the game. This enables the synthesizer to evaluate the content that is being created in relation to the ability to produce a similar experience on the user.

Figure 1:
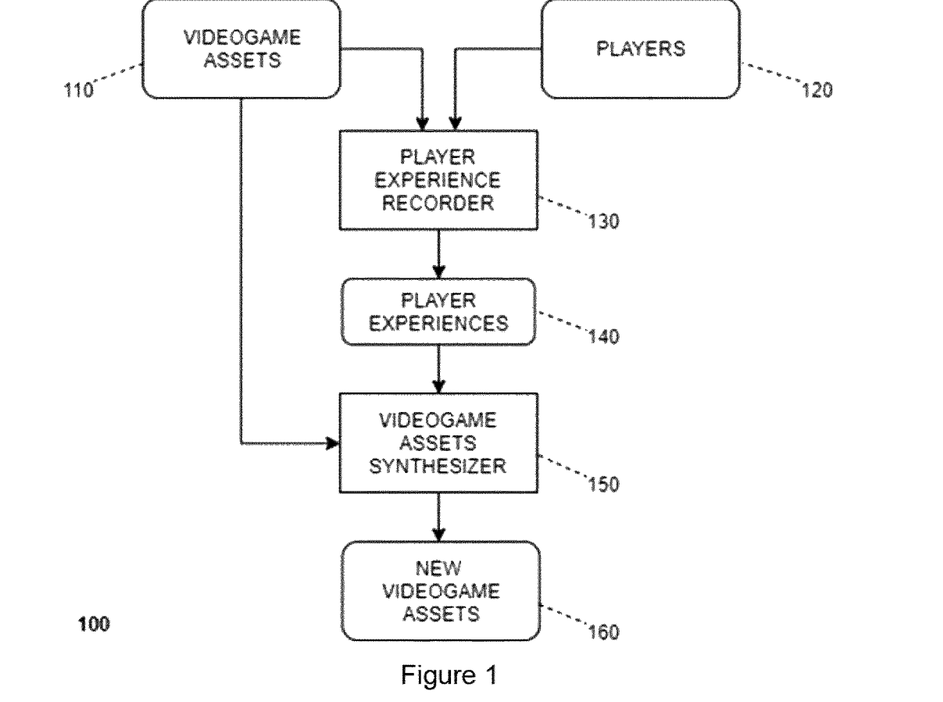
FIG. 1 schematically shows the different components of one embodiment of the present disclosure for automatic synthesis of videogame assets.

FIG. 1 schematically illustrates the different components involved in the system 100 for automatic synthesis of videogame assets. The system comprises a player experience recorder 130, that will be used by players 120, to play with a specific set of videogame assets 110. The videogame assets synthesizer 150 will use the videogame assets 110 and the information 140 gathered by the player experience recorder 130 to create new videogame assets 160.

The videogame assets 110 provided are the same assets that are used in the release version of the videogame. There can be different types of assets used to feed the synthesizer, depending on the purpose of the synthesis process. For instance, while the videogame is being developed, the system can be used to create more content like the one that has been already developed. This can significantly reduce cost and time of development of the game. It is also possible to use the system to extend an already released game, creating a new set of assets like those on the original version, using it as the basis to create extra content for the game that can be sold separately as an extension.

The subset of assets provided as input to the synthesizer can be used as a way of tailoring the output produced by the system. Depending on the type of the assets feed to the synthesizer, it will create different new assets. For example, if a set of maps is provided, the system will produce new maps but if the system is provided with some 3D models of enemies, the system will then produce new enemies as output. Similarly, the system can be used to produce any type of assets like those provided as input (e.g. weapons, characters, decorations, quests, sounds, objects, and the like).

Similarly, the assets provided to the system can be chosen based on some criteria to tailor the new content produced. For example, some videogames are divided into different areas or worlds where the whole game is adapted to fit a specific theme or scenario. For example, the videogame can be set in different environments like a city, the jungle, a desert, a volcanic area, under the water and like the so. If the selection of the assets used as input is based on this theme criteria the system will be able to produce new content that matches the theme.

In addition, it is common for some games to adapt the videogame for a theme that comes from beyond the videogame and it is only used during a specific festivity or period (e.g.: Christmas, Easter, St valentine's day, World cup and like the so). If the selection of assets provided as input share a common theme, the system will be able to produce new content that will also fit that theme.

The system 100 includes a player experience recorder 130 that can be used to capture the experience 140 that the videogame is delivering to the players 120. This information can be used to tailor the videogame assets synthesizer 150 so the assets synthesized are tailored for a specific user or group of users.

Tailoring the system based on different assets and different users provides great benefit when performing some activities related to the creation of videogames. For instance, this tailoring is useful when performing the localization of a videogame, by exposing the new assets only to the player experience previously captured on similar assets from players from a specific region. Similarly, the system can be tailored to synthesize assets that match the experiences from a target group of players such as young players, casual players, hardcore players and the like.

Figure 2:
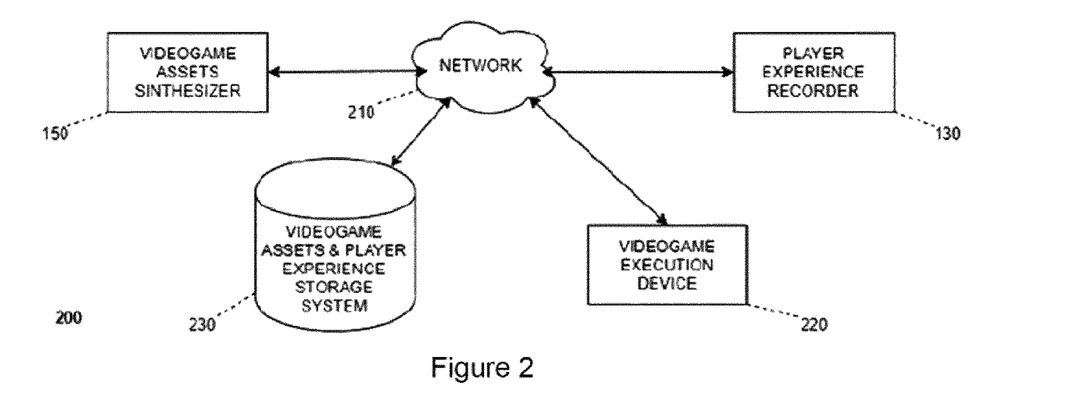
FIG. 2 schematically shows a topology of the system of the present disclosure according to one particular embodiment.

FIG. 2 schematically illustrates a topology of the system. It provides just an example topology 200, including one device of each type connected through the network 210. It includes the videogame assets synthesizer 150, the player experience recorder 130, a storage system to store videogame assets and player experiences 230 (for example a server or a database) and a videogame execution device 220.

The videogame execution device 220 is a device that enables a player to play the game such as a computer, a videogame console, a mobile device or any device with capabilities to execute the videogame. The system is platform agnostic and can be used to create games for any platform, so the videogame execution device could be from any type. An example of a videogame executing device could be a PlayStation® connected to the Internet at home of any player in the world.

Videogames assets synthesized using the present disclosure can be released in any type of format. They can be packaged and released as a physical copy at retail stores or it can be delivered through any digital platform across the network. The presence of the videogame execution device 220 is just to illustrate the topology of the network, but the resulting games can be played on a device not connected to the network.

The system can be deployed over any TCP/IP capable network, such as the Internet or a local area network. However, other embodiments of the present disclosure are adapted to work on networks following a different protocol stack.

In one embodiment of the present disclosure, the system can work with different number of each of the components, having multiple videogame assets synthesizers, multiple player experience recorders, multiple videogame execution devices or multiple storage systems (e.g.: a storage system distributed across different nodes or with different levels of redundancy).

One embodiment of the present disclosure can even work when one of the components is missing: if there are no videogame assets synthesizers the system will work only capturing player experiences, storing them on the storage system for later use; if there are no player experiences capturing devices the system can be used to synthesize new game assets using the data available on the storage system (or one of the asset functions that does not rely on player experiences).

In addition, the different units can exist on isolated machines but can also be embedded in the same device. Thus, in one embodiment of the present disclosure, there exists a single device capable of synthesizing content, capturing the player experience and also hosting the storage for the system.

Figure 3:
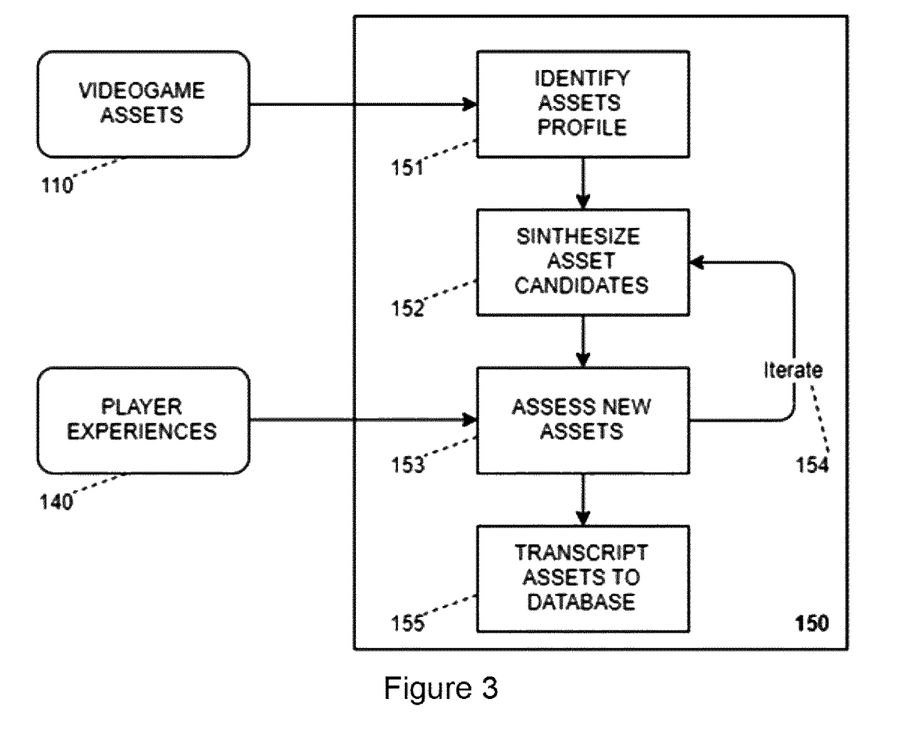
FIG. 3 schematically shows the method followed by the videogame assets synthesizer of the present disclosure according to one particular embodiment.

FIG. 3 schematically shows the steps followed by the videogame assets synthesizer 150 to synthesize new assets. First the assets provided as input are identified 151. Then, some asset candidates are synthesized 152. Next, the candidates are assessed using an assessment function 153. The process of generating assets candidates and assess them is followed for some iterations 154. Finally, the new assets, refined through some iterations, are transcribed to the storage system 155.

The identification 151 of the assets provided as input is performed automatically. This identification is performed through comparisons of the assets provided, identifying common characteristics and those that differ from one asset to another and make them unique. This information is used to generate an asset profile, which is used to describe the set of assets. The profile describes basic characteristics of the assets and can be different for each type of asset. For instance, if the assets provided as input are textures, the profile will include characteristics such as the size, the colour palette used across the textures, and the like. If the set of assets provided as input corresponds to enemies, some of the characteristics that could be part of the profile could be the health, the number and type of weapons, the armour, the behaviours that drive the enemy and the like. This profile is used to identify the set of assets and can be used to match other assets similar to the ones provided. For instance, to enlarge the set of assets used as input. Anyhow, in one embodiment of the present disclosure, the profile is not strictly necessary for the generation of the new assets and its main purpose is to identify the assets provided as input.

The synthesis of asset candidates 152 is performed automatically through the combination and modification of the assets 110 provided as input into new asset candidates 152. As the asset candidates are obtained based on the assets provided as input, they will share similar characteristics with those provided as input. How these combinations and modifications are performed can be parameterized, yielding to different assets candidates. Depending on the needs of each asset being created the videogame assets synthesizer 150 can be tuned by the modification of those parameters (for instance, the number of assets that are combined to create the candidate, the number of modifications to be performed over the candidate, the size of the modifications performed and the so). Different parameters will make the asset candidates synthesized to be more similar or dissimilar to those provided as input.

The assessment of asset candidates 153 is performed automatically to rate the asset candidates based on some criteria encoded by the assessment function. The assessment function will assign a value to each asset candidate. Different assessment functions will penalize or reward some characteristics of the asset candidates. The assessment function can be tailored based on specific needs desired for the new assets being synthesized.

Assessment functions can be based on the experience of the player when playing the game. In one embodiment of the present disclosure, player experiences 140 that have been previously captured by the system are used. These game experiences represent what the player has experimented when playing with a specific set of assets. This can be used to extrapolate what the user could feel when playing when the new asset candidates. This will allow the system to guide the synthesization of the assets to obtain assets that will provide a positive experience on the players.

It is possible to select what player experiences are used to assess a specific asset. For example, the assessment function can be restricted to use only those player experiences recorded when players were playing with the assets used as input. Similarly, the player experiences used can be restricted only to a specific set of players. It is also possible to extend the set of player experiences to those recorded when playing with assets similar to those being used as input. This can be done based on the asset profiles identified by the system in step 151.

Additionally, the assessment can be performed on information not related to the player experience at all, but using generic properties that are generally desired when creating videogame assets such as the duration of the game, the level of challenge that will present to an average player, the impact that those assets could have on the focus of the player and the like.

For instance, in one embodiment of the present disclosure, an assessment is designed to synthesize enemies that are hard to kill. The value assigned to candidates depends on characteristics such as the strength, the rate of fire or the health points of the enemy, yielding to higher values for difficult enemies. Similarly, comparisons of the assets being assessed with those previously used to capture the experience can be used to determine the value assigned to the candidate.

The values assigned to each asset candidates are used to determine how good they are as new assets. This is considered when the next iteration is performed, favoring those assets with a high value assigned to be recombined into new assets candidates. This ensures that the best candidates are used to generate the next set of asset candidates.

The process of iteration 154 is repeated until some stop criteria is meet. The stop criteria can be set based on different parameters such as the time available, the resources available, previous empirical experiences and the like. The criteria used to set the stop condition will determine the time spent to synthesize the new assets and the quality of those assets. Depending on the purpose of the system this condition can be modified.

Figure 4:
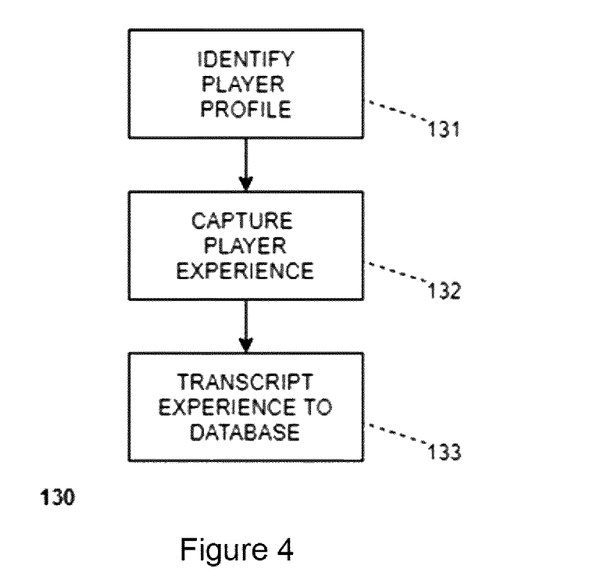
FIG. 4 schematically shows the steps run by the player experience recording device according to one particular embodiment of the present disclosure.

Finally, the assets candidates are transcribed 155 to the storage system. At this point the assets are ready to be used on the videogame, as an extension or as a modification of it. Depending on the purpose of the system those assets will be directly added to the game or will be stored for later use by the development team FIG. 4 schematically depicts the method followed by the player experience recording device 130. First, the player experience recorder 130 identifies the player profile 131. Then, it captures 132 the player experience. Finally, the player experience is transcribed 133 to the storage system. The purpose of the player experience recorder is to capture what the player is experimenting while playing the game, in order to be used as an assessment function of the new content synthesized by the system.

In one embodiment of the present disclosure, the identification 131 of the player profile is performed automatically. It will be used to determine the type of player that is playing the videogame, as it is useful to group different player experiences based on their profile information. To this end, some information about the player is gathered such as the country, the hour, the length of the play session, the number and frequency of stops, the parts of the game that are being played and the like.

Player profile information can be complemented with additional information directly requested to the user. This enquire can be performed through any means such as a questionnaire, the request to create an account with the system or the like. The player profile can be also generated based on the decisions taken during the game, mainly when there is some decisions presented to the player. For example, when deciding the role of their character in the game (warrior, archer and the like), when choosing the preferred type of weapons, when choosing the preferred car and the like. This type of information can be gathered across time, and even across different games whose content is being synthesized through the system. That is, the profile can be alive and evolve each time the player is playing with the game. In one embodiment of the present disclosure, player profile can even come from other sources, such as but not limited to, advertising platforms, digital videogames platforms, social networks and the like.

Capturing 132 player experience is performed automatically while the player is playing the game. Player experiences encapsulate what the game delivers to the player when playing. The granularity of the information being captured varies from one game to another. Similarly it can vary depending on the number of player experiences previously captured for that specific assets or that specific player. The information that will be gathered during the play will be related with the in-game assets. For example, if the player skips some dialogs or others, if the player selects one stage or another, if the player follows one path on a map or another, when and how does the player dies, when and how does the player kills the enemies, what is the most used weapon and the so. Depending on the embodiment of the present disclosure, different sources of information may be added for capturing player experience. For instance, more information about the experience can be captured by the controller used for playing. In that case, the strength being used to push the buttons or the information measured by the accelerometers of the controller and the like can be used. Similarly, additional devices can be used only to capture information about the player experience. This type of devices will be only present on the player experience capturing device and not present when the player is just playing the game and its experience is not being captured. For example, cameras can be used to track the eye movement or the facial expression of the player, sensors can be attached to the player to measure the response of their bodies.

Finally, the player experience is transcribed to the storage system 133. The information transcribed contains the information about the payer profile, the assets that were involved in the game and the information about the experience gathered by the system.

It will be understood that when an element is generally defined as being "connected to" or "communicated with" or similar expressions, without explicitly defining that it is "directly connected to" or "in direct communication with" another element in the present description, it may be 'directly connected to' or 'in direct communication with' another element or be "connected to" or "in communication with" another element that has other intermediate elements between them.

The present disclosure is not limited by the embodiment disclosed herein. Other embodiments can be made by persons skilled in the art in light of this description.

The invention claimed is:

1. A method for synthesizing videogame assets, —the method comprising:
   receiving a first set of videogame assets as input;
   automatically identifying, by at least one processor, one or more common features among videogame assets of the first set of videogame assets;
   clustering, by at least one processor, the videogame assets of the first set of videogame assets into one or more different videogame asset profiles, wherein each of the one or more different videogame asset profiles includes videogame assets that share at least one of the one or more common features identified among the videogame assets of the first set of videogame assets;
   synthesizing, by at least one processor, a subset of new videogame asset candidates for an asset profile from the one or more different videogame asset profiles that share the at least one of the one or more common features, based on the videogame assets of the first set of videogame assets clustered into the asset profile wherein synthesizing the subset of new videogame asset candidates is based on at least one of a parameter associated with the first set of videogame assets, a type of video game asset, an interaction between game assets, a combination of one or more different videogame assets, at least one modification performed on a video game asset, one or more shapes, one or more movements, or one or more themes;
   applying a rating, by at least one processor, to each new videogame asset candidate of the subset of the new videogame asset candidates synthesized, based on a predetermined quality threshold, wherein the rating is set for at least one parameter of the new videogame asset candidates based at least on player experience data associated with asset relevance and player engagement;
   storing, by at least one processor, the rating applied to each of the new videogame asset candidates in a database, and based on the rating; and
   dynamically updating, by at least one processor, game content in response to player interaction data and one or more stored ratings that is fed back to influence the synthesis of one or more new videogame asset candidates.

2. The method according to claim 1 wherein synthesizing the subset of new videogame asset candidates comprises synthesizing at least one asset candidate by modifying one asset from the first set of videogame assets received.

3. The method according to claim 1 wherein synthesizing the subset of new videogame asset candidates comprises synthesizing at least one asset candidate by combining at least two assets from the first set of videogame assets received.

4. The method according to claim 1 wherein synthesizing the subset of new videogame asset candidates comprises synthesizing at least one asset candidate by creating the at least one asset candidate from scratch.

5. The method according to claim 1, wherein storing the videogame assets in the database further comprises discarding the videogame assets rated under a minimum rating required.

6. The method according to claim 1, wherein rating the asset candidates comprises comparing a set of features of the asset candidates with the same set of features of the first set of videogame assets.

7. The method according to claim 1, wherein rating the asset candidates further comprises recording player experience information of a user playing with the first set of videogame assets.

8. The method according to claim 1, wherein rating the asset candidates further comprises recording player experience information of a user playing with the videogame assets stored in the database.

9. The method according to claim 1, wherein storing the videogame assets in the database further comprises serializing the videogame assets.

10. A system for synthesizing videogame assets, wherein the system comprises a videogame asset synthesizer configured to:
    receive a first set of videogame assets;
    automatically identify one or more common features among videogame assets of the first set of videogame assets;
    cluster the videogame assets of the first set of videogame assets into one or more different videogame asset profiles, wherein each of the one or more different videogame asset profiles includes videogame assets that share at least one of the one or more common features identified among the vide game assets of the first set of videogame assets;
    synthesize a subset of new videogame asset candidates for an asset profile from the one or more different videogame asset profiles that share the at least one of the one or more common features, based on the videogame assets clustered into the asset profile, wherein synthesizing the subset of new videogame asset candidates is based on at least one of a parameter associated with the first set of videogame assets, a type of video game asset, an interaction between game assets, a combination of one or more different videogame assets, at least one modification performed on a video game asset, one or more shapes, one or more movements, or one or more themes;
    apply a rating to each new videogame asset candidate of the subset of the new videogame asset candidates synthesized based on a predetermined quality threshold, wherein the rating is set for at least one parameter of the new videogame asset candidates based at least on player experience data associated with asset relevance and player engagement;

send the videogame assets to a database to be stored based on the rating; and dynamically update game content in response to player interaction data and one or more stored ratings that is fed back to influence the synthesis of one or more new videogame asset candidates.

11. The system according to claim 10 further comprising a database configured to:

store assets sent from the videogame asset synthesizer based on the rating.

12. The system according to claim 11 further comprising a player experience recorder configured to:

record player experience information while playing with certain videogame assets, wherein the database is further configured to store a recording of the player experience information.

13. The system according to claim 12 further comprising a telecommunication network configured to:

exchange information between the videogame asset synthesizer, the database, and the player experience recorder.

14. The system according to claim 13 further comprising a videogame execution device connected to the telecommunication network, wherein the videogame execution device is configured to:

execute videogames resulting from the videogame assets stored in the database.

15. A computer program product, comprising at least one non-transitory computer-readable medium including program instructions that, when executed by at least one processor, cause the at least one processor to:

receive a first set of videogame assets;

automatically identify one or more common features among videogame assets of the first set of videogame assets;

cluster the videogame assets of the first set of videogame assets into one or more different videogame asset profiles, wherein each of the one or more different videogame asset profiles includes videogame assets that share at least one of the one or more common features identified among the videogame assets of the first set of videogame assets;

synthesize a subset of new videogame asset candidates for an asset profile from the one or more different videogame asset profiles that share the at least one of the one or more common features, based on the videogame assets clustered into the asset profile, wherein synthesizing the subset of new videogame asset candidates is based on at least one of a parameter associated with the first set of videogame assets, a type of video game asset, an interaction between game assets, a combination of one or more different videogame assets, at least one modification performed on a video game asset, one or more shapes, one or more movements, or one or more themes;

apply a rating to each new videogame asset candidate of the subset of the new videogame asset candidates synthesized based on a predetermined quality threshold, wherein the rating is set for at least one parameter of the new videogame asset candidates based at least on player experience data associated with asset relevance and player engagement;

send the videogame assets to a database to be stored based on the rating; and dynamically update game content in response to player interaction data and one or more stored ratings that is fed back to influence the synthesis of one or more new videogame asset candidates, wherein said computer program product is executed in at least one of a general purpose processor, a digital signal processor, an FPGA, an ASIC, a microprocessor, a microcontroller, or any other form of programmable hardware.

* * * * *

UNITED STATES PATENT AND TRADEMARK OFFICE
CERTIFICATE OF CORRECTION

PATENT NO. : 12,121,814 B2
APPLICATION NO. : 17/786320
DATED : October 22, 2024
INVENTOR(S) : Jaime Font Burdeus et al.

Page 1 of 1

It is certified that error appears in the above-identified patent and that said Letters Patent is hereby corrected as shown below:

In the Claims

Column 9, Line 28, Claim 1, delete "-the" and insert -- the --

Column 10, Line 49, Claim 10, delete "vide game" and insert -- videogame --

Signed and Sealed this
Seventh Day of January, 2025

Derrick Brent
*Acting Director of the United States Patent and Trademark Office*